UNITED STATES PATENT OFFICE.

ALEXANDER S. RAMAGE, OF BUFFALO, NEW YORK, ASSIGNOR TO CHEMICAL DEVELOPMENT CO., OF BUFFALO, N. Y., A CORPORATION OF COLORADO.

METHOD OF PREPARING PURE LEAD SULFATE FROM IMPURE SULFATE.

950,677.  Specification of Letters Patent.  Patented Mar. 1, 1910.

No Drawing.  Application filed October 22, 1909.  Serial No. 524,082.

*To all whom it may concern:*

Be it known that I, ALEXANDER S. RAMAGE, a citizen of the United States, residing at Buffalo, in the county of Erie and State of New York, have invented certain new and useful Improvements in Methods of Preparing Pure Lead Sulfate from Impure Sulfate, of which the following is a specification.

The object of this invention is to utilize impure lead sulfate as obtained for example from leaden vitriol chambers or from the roasting of galena ores. If the lead sulfate is from vitriol chambers it generally contains about five per cent. of free sulfuric acid which is washed out in the usual way. The lead sulfate from either source is then completely dissolved by boiling it with an excess of caustic soda, yielding a solution containing sodium plumbite and sodium sulfate. This plumbite solution is practically colorless, but nevertheless carries certain impurities derived from the crude sulfate which even in minute proportions impart a color to lead sulfate precipitated therefrom, rendering it useless for certain purposes, and notably for the preparation of pigments. This is more particularly the case with the metals of the iron group, slight traces of whose acid salts are found to undergo hydrolysis in presence of large quantities of water used for washing. This solution is therefor treated with an oxidizing reagent, preferably bichromate of potash or soda, and heated near to boiling. This throws out the iron, manganese, nickel and cobalt as basic compounds. The solution of plumbite thus purified from all materials capable of contaminating the lead sulfate is then rendered acid by means of sulfuric acid. The lead sulfate is completely precipitated and pure sodium sulfate remains in the solution with a trace of free sulfuric acid. The sodium sulfate is recovered in any of the known ways. The pure lead sulfate is well washed with water which has been purified by treatment with a basic compound of lead as set forth in my copending application Serial No. 524,081, filed October 22, 1909, the washing being continued until the filtrate shows no sign of acid.

I claim:—

The method of purifying sulfate of lead which consists in dissolving crude lead sulfate in an alkaline hydroxid, purifying the resulting plumbite solution by the joint action of an oxidizing agent and heat separating the precipitated impurities, and precipitating pure lead sulfate from the purified solution.

In testimony whereof, I affix my signature in presence of two witnesses.

ALEXANDER S. RAMAGE.

Witnesses:
ETHEL DANIELS,
CHARLES H. POTTER.